April 1, 1969 E. C. FORCIER 3,435,815

WAFER DICER

Filed July 15, 1966

United States Patent Office 3,435,815

Patented Apr. 1, 1969

3,435,815
WAFER DICER

Edward C. Forcier, Worcester, Mass., assignor to Micro Tech Mfg., Inc., Worcester, Mass., a corporation of California Filed July 15, 1966, Ser. No. 565,626
Int. Cl. B28d *1/06*
U.S. Cl. 125—16 2 Claims

ABSTRACT OF THE DISCLOSURE

The subdivision of a semiconductor wafer by drawing loops of a fine wire across the surface of the wafer to abrade cuts into the wafer surface with an abrasive material on the loop wire. The abrasive material is applied to the single length of wire as it is drawn from a feed spool and is removed from the wire before it is wound-up on a takeup spool.

This invention relates to cutting small hard bodies into a large number of miniature segments and more particularly to subdividing a small semiconductor wafer into a large number of individual dice and to apparatus for cutting such bodies.

In the miniaturizing of the electronic components it has become important to produce and test a large number of miniature electronic units on a common body and then subsequently subdivide the body. Semiconductive wafers such as silicon wafers are prepared with mirco-circuits or very small individual components repetitiously produced in large numbers in rows slightly spaced apart in regular array. The individual units are separated by a dicing operation in which the hard wafer is severed at the intervals between the individual units. As the units are formed on the wafer in an array of rows the separation may be effected along parallel lines between these rows both in the X or the Y axes.

The semiconductive wafers in and of themselves are small being generally an inch square and the minuteness is demonstrated by the fact that a single wafer can carry several thousand individual units in the array. The semicondutcive wafers consist generally of silicon which has a hardness of the order of #7 on the Mohs Scale of Hardness. The operation of separating these individual units on this hard material from each other must be precise and therefore a high degree of accuracy is necessary in cutting the parallel lines between the parallel rows of devices. At the same time the large number of units involved and the extensive preparation which takes place before the dicing makes it desirable to avoid loss through dicing, either of the units as a whole or of the material between the units.

In dividing up the semiconductive wafer it is important that the dips that are produced by the severing operation be maintained in their original orientation as this facilitates subsequent use. At the same time, it is important that the cutting action be rapid as well as avoid waste.

It is an object of this invention to provide a fast and accurate method of cutting small, hard bodies.

It is another object of this invention to provide simple and economical apparatus for rapidly and efficiently dicing semiconductive wafers.

It is still another object of this invention to provide a technique for precisely separating semiconductor wafers into dice in the fabrication of semiconductor devices.

In general the hard body is divided according to this invention by rapidly drawing a very thin wire across its surface continously in a single direction while feeding an abrasive slurry to the wire and the wire draws the slurry across the body only once and the abrasive material is removed from the wire after this one pass. Thus the abrasive slurry acts to wear away the hard material only at the point of contact of the wire with the body. The abrasive is moved across the body in a single direction by a continuous movement. In a preferred embodiment the method comprises feeding a length of wire from one reel and around grooved rotatable guides in loops of the wire which make a plurality of contacts with the body surface, feeding an abrasive slurry to the wire as it passes through the loops and bringing the abrasive slurry against the body and then after the continuously traveling wire moves from the loops, wiping off the abrasive slurry carried thereon and finally gathering the cleaned wire on a second reel. It is a feature of this embodiment that after the continuous transfer of the wire from one reel to the other by movement in a single direction for a period of time greater than a few minutes, the travel of the wire can be reversed and moved continuously in the opposite direction following an identical procedure in which abrasive slurry is applied nad moved continuously in but a single direction across the body only in contact with the area of contact of the thin wire with the body.

The wire diameter is of the order of 3 mils and preferably is less than 10 mils. The wire moves across the body at rates in excess of 100 feet a minute.

The abrasive slurry is sufficiently fine so as to cause the width of the cut in the solid material to be of the order of not ⅓ greater than the wire diameter and sufficiently viscous to provide rapid cutting.

The hard body so severed comprises a number of small dice separated by cuts which are only fractionally greater in width than the diameter of the wire. In a preferred embodiment the dice are separated by cuts in both the X and Y axes without loss of orientation in the arrangement of the divided parts with respect to each other.

A better understanding of the invention may be had from the following description and drawings in which.

The wire cutting machine of this invention comprises a small diameter wire utilized to carry an abrasive compound which cuts a way through the hard material of the workpiece by abrasion. The wire is suitably driven and continuously moves in a single direction while the abrasive compound is applied to it moved across the work and removed from it. The workpiece is mounted on a platform and the mounted work is placed in the cutter. Typical semiconductive wafers for dicing are illustrated in Scientific American, November 1965 issue, p. 57.

Figures 1, 2:
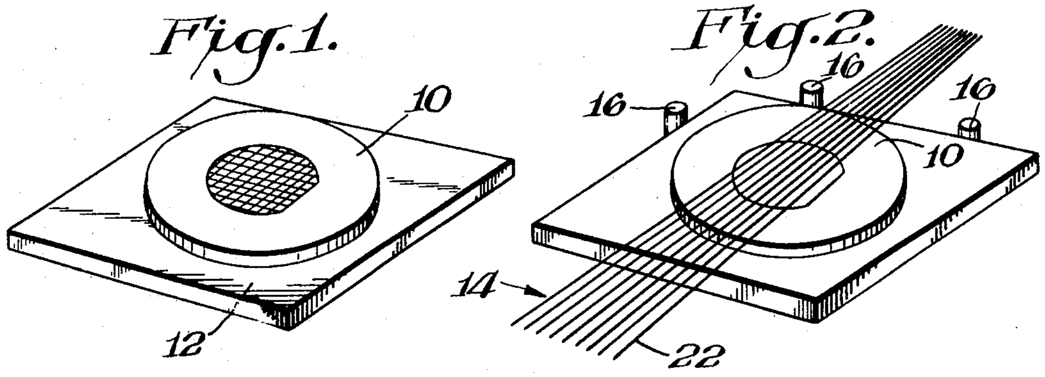
FIGURE 1 is a perspective view of a wafer mounted for dicing according to this invention.
FIGURE 2 is a perspective view of the dicing mechanism for this invention.

Referring in more particularity to the drawings, a semiconductive wafer 10 of silicon or like semiconductive material has a plurality of miniature electrical components located on the underside of the wafer as viewed in FIGURE 1. The wafer may be approximately one inch square or larger and can carry several hundred spaced apart miniature components arranged upon the wafer in parallel rows. Each electrical component is separated from the adjacent components by cutting through the wafer between the components and the dicing method and apparatus of the present invention perform this operation in a highly efficient and satisfactory manner. Prior to the actual cutting operation the semiconductive wafer may be anchored upon a base plate 12. In one suitable construction a plurality of perforations directly beneath the wafer apply suction from the underside of the base plate and anchor the wafer in place.

As shown in FIGURE 2, the base plate 12 can be accurately and easily positioned upon work supporting structure under the cutting head 14 of the dicing machine by providing the supporting structure with a plurality of aligning pins 16. The base plate is simply urged into engagement with the pins to properly orient the plate with respect to the cutting head.

Figures 3, 4:
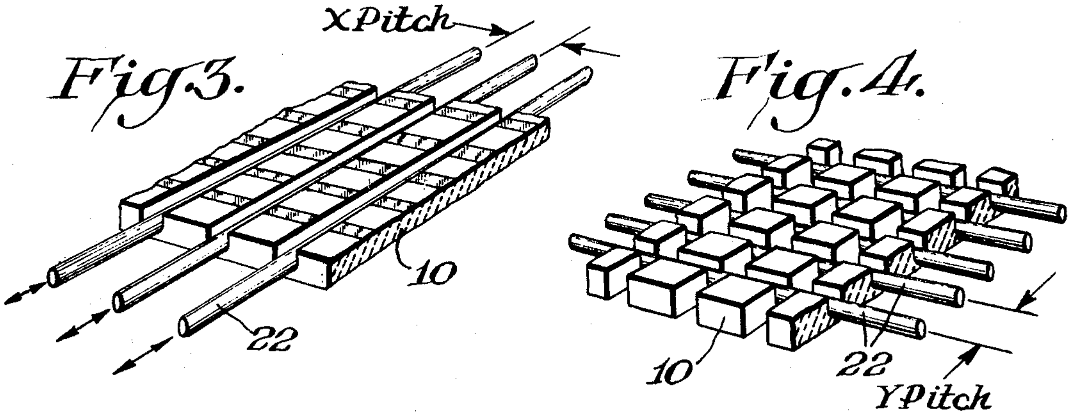
FIGURE 3 is a perspective view showing one step in the dicing method of this invention.
FIGURE 4 is a perspective view of another step in the dicing method of this invention.

The cutting head 14 of the dicing machine comprises a single length cutting wire which is wrapped around a pair of spaced rollers a predetermined number of times to form the cutting head arrangement shown in FIGURE 2. During the cutting operation the cutting wire is fed from a spool source to the spaced rollers and after being wound around the rollers the wire is then stored upon a take-up spool. The cutting wire portions comprising the cutting head are coated with an abrasive slurry that abrades through the wafer, as shown in FIGURE 3, as the wafer is urged into engagement with the cutting head. The length of cutting wire may enable a single wafer to be diced before the direction of wire rotation need be reversed. The slurry is applied by suitable apparatus, not shown, such as small bottles which dispense the suspension directly across the wires.

The parallel spaced apart portions of the cutting wire comprising the cutting head finally penetrate the full depth of the wafer. A second right angle cut is then made and upon completion of that cut, the base plate is removed from the cutting apparatus and the individual cut dies are removed and cleaned.

Figure 5:
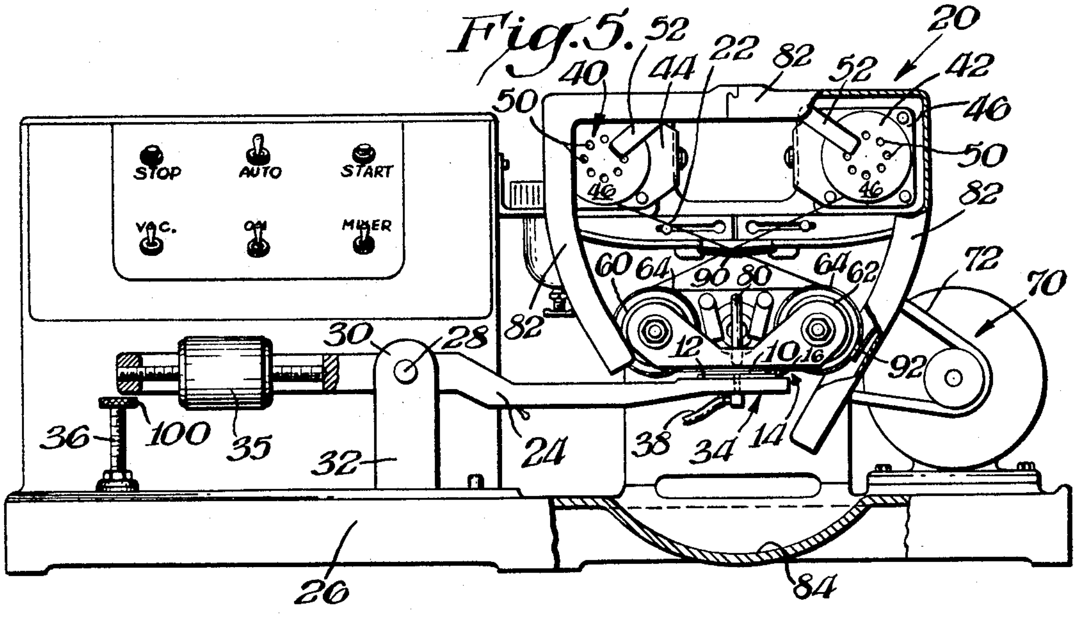
FIGURE 5 is a front elevation of an apparatus for carrying out dicing according to this invention.

FIGURE 5 illustrates an apparatus 20 for dicing semiconductive wafers 10 by continuously moving a single length cutting wire 22 and abrasive slurry in a predetermined pattern across the surface of the wafer. The wafer 10 can be positioned upon the base plate 12 with the miniature components face down and the base plate positioned directly beneath the cutting head 14 of the machine. The wafer is cut by gently urging it into engagement with the cutting head, as explained more fully below.

The dicing apparatus of the present invention includes an elongated work supporting arm 24 suitably journaled at its mid portion to the main framework 26 of the apparatus by a pivot pin 28 that anchors the arm to the bifurcated end 30 of a post 32. A platform 34 at one end of the arm supports the base plate in predetermined position below the cutting head 14 and this platform is provided with aligning pins 16 to facilitate such positioning. At the opposite end of the arm a counterbalance 35 is connected to urge the platform end of the arm into engagement with the cutting head. An adjustable stop 36 adjacent the counterbalance is provided to limit the downward movement of the counterbalance end of the arm which in turn limits the upward movement of the wafer located on the platform 34 at the opposite end.

The platform 34 of the work supporting arm 24 may be provided with a vacuum line 38 suitably connected to a vacuum source (not shown) so that suction can be supplied to the platform to hold the wafer in predetermined position upon the base plate 12; the base plate in turn being provided with perforations so that suction is applied to the wafer.

The cutting wire 22 of the cutting machine 20 is a single length wire which is stored on a pair of reversible take-up spools 40, 42 each of which is driven by a torque motor 44, 46 secured to the main framework of the apparatus. Each spool has a pair of end flanges 46 secured to the spool shaft. The flanges include a plurality of circular openings 50 which are arranged in circular fashion in close proximity to the shaft. A photocell 52 located outside each spool near the openings 50 is provided to reverse the rotation of the take-up spools when the wire on the spool being unwound reaches a predetermined minimum. When the wire on that spool reaches the foregoing minimum, light is allowed to pass between the aligned openings 50 in the end flanges 46 of the spool, and this photocell then triggers the reversing mechanism, as explained below.

The cutting wire 22 runs from the take-up spools 40, 42 to a pair of spacing rollers 60, 62 journaled to the main framework of the cutting machine below the spools. The outer surface of each roller has a series of grooves 64 and the wire is trained about the rollers and guided by the grooves. As illustrated in FIGURE 5, the cutting wire runs from the right hand take-up spool 42 to the left hand spacing roller 60 and then from the underside of that roller to the underside of the right hand roller 62. The winding of the wire about the rollers is continued until it is positioned in each groove 64 and thereafter the wire runs from the right hand roller 62 to the left hand take-up spool 40.

The spacing rollers 60, 62 are driven by a reversible motor 70 which is connected thereto by belting 72. The motor can by synchronized with the rotation of the take-up spools so that its rotation is reversed when the rotation of the take-up spools is reversed.

An abrasive slurry feed outlet 80 located directly above the cutting head 14 is provided to apply abrasive material to the cutting wire during the cutting operation. Suitable splash guards 82 secured to the frame work prevent the slurry from splashing about and these guards also function to direct the slurry into a catch 84 positioned in the framework below the wafer being cut.

Wipers 90 are provided to clean the abrasive slurry from the wire before it is wound on either of the take-up spools. Additional wipers such as 92 can also be provided to clean the slurry from the spacing rollers.

In operation, the cutting apparatus 20 of the present invention functions to dice a semiconductive wafer 10 by urging it gently into engagement with the cutting head 14 of the machine. Prior to the actual cutting operation the wafer is positioned upon the base plate 12 after which the base plate is positioned upon the platform 34 of the elongated work supporting arm 24. The aligning pins 16 on the platform serve to orient the base plate with respect to the cutting head and the operator manually positions the plate upon the platform so that the plate sides contact the pins. Suction can then be applied to the platform by means of the suction supply line 38. When the foregoing steps are completed, the wafer is ready for the first cut.

Next, operation of the machine is started and the counterbalance 35 urges the wafer into the cutting head. As the wire rotates along its path of cutting motion which path is from spool 40 over the spacing rollers 60, 62 a given number of turns and then to take-up spool 42, an abrasive containing slurry is deposited upon those portions of the cutting wire forming the cutting head. The abrasive cuts through the semiconductive wafer in the area where the wire contacts the wafer until the wire completely penetrates the wafer. When the cut is complete, the machine stops.

The right angle cut which completes the dicing operation is made by the cutting head 14 after the base plate is rotated 90° by lifting and then return to its position on the platform. When the right angle cut is finished, the base plate 12 and the diced wafer 10 are removed from the machine which is then ready for another dicing operation.

As mentioned above, the photocells 52 control the rotational direction of the take-up spools 40 and 42. Assuming that spool 40 is functioning as the feed and spool 42 serving as the take-up, the spool 40 continues to rotate in a counterclockwise direction, as viewed in FIGURE 5, until the wire on that spool clears the openings 50. When this occurs, light penetrates through the now exposed openings 50 in the end flanges of the spool and energizes the photocell 52. This signal in turn causes a relay to start the operation of stopping the main motor 70 which drives the spacing rollers 60 and 62. Ultimately, the take-up spool 42 becomes the new feed spool and the prior feed spool 40 commences to take up the cutting wire. The cutting wire continues to be fed from the spool 42 until the wire clears the openings 50 in that spool. At this time the photocell 52 adjacent the spool 42 causes a similar reversing operation. It will be understood that the reversibility of the wire movement is merely due to the fact that a length of wire can remain in the machine through months of operation. An individual wafer may be cut through by only a section of the wire moving continuously in one direction at the high speed of the wire of this device. These speeds which are in excess of 100 feet per minute may range as high as 10,000 feet per minute but preferably are between 300 and 1000 feet per minute.

In the cutting machinery 20 of the present invention the wipers 90 serve to clean the cutting wire of the abrasive slurry before the wire is taken up by the spools. Other cleaning devices such as the brush 92 also function to clean the spacing rollers. Splash guards 82 are also appropriately positioned to contain the slurry and to direct it into the catch 84 located in the frame work 26 of the machine below the cutting head.

Although numerous abrasive slurries may be utilized to abarde away the semiconductive wafer, those slurries which permit the cutting wire to penetrate the wafer at the rate of .001 to .008 inch per mnute are particularly well suited for the cutting operation. A suitable slurry may be made up of silicon carbide abrasives of grits of 600–800 or 1000. Additionally, cutting wire diameters of as much as 0.01 inch are suitable for cutting wafers containing miniature electrical components, but those wires in the range of .0005 to .005 are particularly adapted for the cutting operation.

The apparatus and method of the present invention enable wafers to be diced with a minimum kerf loss. For example, a wire .003 inch in diameter produces a cut width of only .0037 inch.

Among other advantages this device provides a fast accurate and high yield method of dicing semiconductor wafers. The cutting is precise so that the closely spaced units can be accurately processed. The operation is automatic and the apparatus requires a minimum of maintenance.

In the continuous wire arrangement of this device a high peripheral wire speed is reached with motion in a single direction of many feet per minute. Despite the shortened elapsed time a 100% yield is possible. This is coupled with the low loss of material.

Further the exact orientation of the separated parts is maintained yet there is sufficient clearance between the dice to permit a pick-up tool to transfer each finished die to its respective mounting surface.

The apparatus is simple and easy to operate as evidenced by the ease with which the rolls of wire can be changed.

While a specific apparatus has been shown and described in the illustrated embodiment, it will be understood that the particular parts and their arrangement may be varied within the spirit of this invention. For example the signal which stops the main motor can be made to alter the voltage applied to the take-up spool as to maintain proper tensioning of the cutting wire during the reversing operation. Another modification can be provided in a switch which senses the position of the supporting arm 24 and is arranged so that the machine stops when the platform end of the arm 24 has moved to a position where the cutting is complete.

While the above described embodiment refers to cutting silicon with a hardness of the order of #7 it will be understood that this invention is applicable to the cutting of other materials including softer materials. The invention is particularly applicable to materials that the are sensitive to vibration and shock and would deteriorate quickly under vibration. The gentle, swift cutting and abrading action of this invention permits beneficial cutting and abrading of even these soft materials. This cutting technique therefore is advantageous through a range of hardnesses as for example from #4 Mohs Scale to as high as #8 Mohs Scale.

Further changes within the spirit of this invention may be made in the above-described embodiments which are therefore set forth for the purpose of illustration only and it will be understood that it is intended that the scope be limited only by the appended claims.

What is claimed is:

1. A method of dividing a small body of material into minute pieces which comprises contacting a surface of the body with a plurality of turns of a single length of fine wire, rapidly drawing the single length of fine wire in only one direction from a feed-means around guide means across the contacted body surface around a second guide means and to a wire take-up means without interruption, applying an abrasive material to the single length of fine wire only between the point of departure of the single length from the feed-means and before contacting the wire on the body surface, engaging the abrasive material against the body in the area of the contact of the wire with the body, rapidly moving the abrasive material across the body continuously in only the single direction of the wire movement to abrade the body in the area of the contact of the wire, removing the abrasive from the wire intermediate the point of departure from the contact with the body surface and the take-up on the take-up spool.

2. In a machine for dividing a small body of material into a great number of minute pieces including a plurality of turns of a single length of fine wire looped around guides, the improvement comprising means for drawing the single length of wire directly from the guides continuously in only one direction at a rapid rate of travel, means for applying an abrasive viscous substance to the wire, said means positioned adjacent the turns, and a single means for removing the abrasive from the single wire located intermediate the guide means and the drawing means and a mechanism effective to move said body in engagement with the abrasive material to press the abrasive material continuously against the body while the abrasive material is drawn continuously in only one direction by the drawing means so that the abrasive material abrades the wafer surface only at the point of contact of the wire with the body.

References Cited

UNITED STATES PATENTS

| | | | |
|---|---|---|---|
| 3,155,087 | 11/1964 | Dreyfus | 125—21 |
| 2,978,001 | 4/1961 | Whisler | 146—880 X |
| 1,743,057 | 1/1930 | Wienholtz et al. | 125—21 |

FOREIGN PATENTS

| | | |
|---|---|---|
| 717,874 | 11/1954 | Great Britain. |
| 771,622 | 4/1957 | Great Britain. |
| 477,764 | 2/1953 | Italy. |

JAMES L. JONES, Jr., *Primary Examiner.*